(12) United States Patent
Harpaz

(10) Patent No.: US 6,494,648 B2
(45) Date of Patent: Dec. 17, 2002

(54) CUTTING TOOL ASSEMBLY

(75) Inventor: Jacob Harpaz, Kfar Vradim (IL)

(73) Assignee: Iscar Ltd., Tefen (IL)

(*) Notice: Subject to any disclaimer, the term of this patent is extended or adjusted under 35 U.S.C. 154(b) by 0 days.

(21) Appl. No.: 09/895,299

(22) Filed: Jul. 2, 2001

(65) Prior Publication Data

US 2002/0006315 A1 Jan. 17, 2002

(30) Foreign Application Priority Data

Jul. 16, 2000 (IL) .................................................. 137316

(51) Int. Cl.$^7$ ................................ B23C 5/00; B26D 1/12
(52) U.S. Cl. ........................... 407/30; 407/33; 408/233
(58) Field of Search ............................. 407/30, 33, 34, 407/46; 408/233, 713; 279/103, 83

(56) References Cited

U.S. PATENT DOCUMENTS

| | | | | |
|---|---|---|---|---|
| 2,917,954 A | * | 12/1959 | Miller | 29/271 |
| 4,166,711 A | * | 9/1979 | Kress et al. | 408/233 |
| 5,010,967 A | * | 4/1991 | Desai | 166/55.7 |
| 5,078,555 A | * | 1/1992 | Aurentz | 408/231 |
| 5,114,286 A | * | 5/1992 | Calkins | 408/226 |
| 5,143,495 A | | 9/1992 | Bosek | 409/233 |
| 5,277,435 A | | 1/1994 | Kramer et al. | 279/9.1 |
| 5,399,051 A | * | 3/1995 | Aken et al. | 279/83 |
| 5,403,134 A | | 4/1995 | Andersson et al. | 409/234 |
| 5,598,751 A | * | 2/1997 | Ochayon et al. | 408/226 |
| 5,851,094 A | | 12/1998 | Strand et al. | 409/234 |
| 5,971,670 A | * | 10/1999 | Pantzar et al. | 407/119 |
| 6,109,152 A | | 8/2000 | Hecht | 82/160 |
| 6,394,465 B1 | | 5/2002 | Guy | 409/234 |

FOREIGN PATENT DOCUMENTS

| | | |
|---|---|---|
| EP | 0 298 937 B1 | 10/1992 |
| WO | WO 01/54849 A1 | 8/2001 |

* cited by examiner

*Primary Examiner*—Kien T. Nguyen
(74) *Attorney, Agent, or Firm*—Pennie & Edmonds LLP

(57) ABSTRACT

The present invention provides a cutting tool assembly having a tool shank with an elongated hole extending axially through the tool shank. An elongated support bar having threaded bore at its forward end is retained in the elongated hole. A cutting head having a forward cutting portion and a rear threaded portion is retained in the support bar with its rear threaded portion threadingly engaged with the threaded bore in the forward end of the support bar.

7 Claims, 4 Drawing Sheets

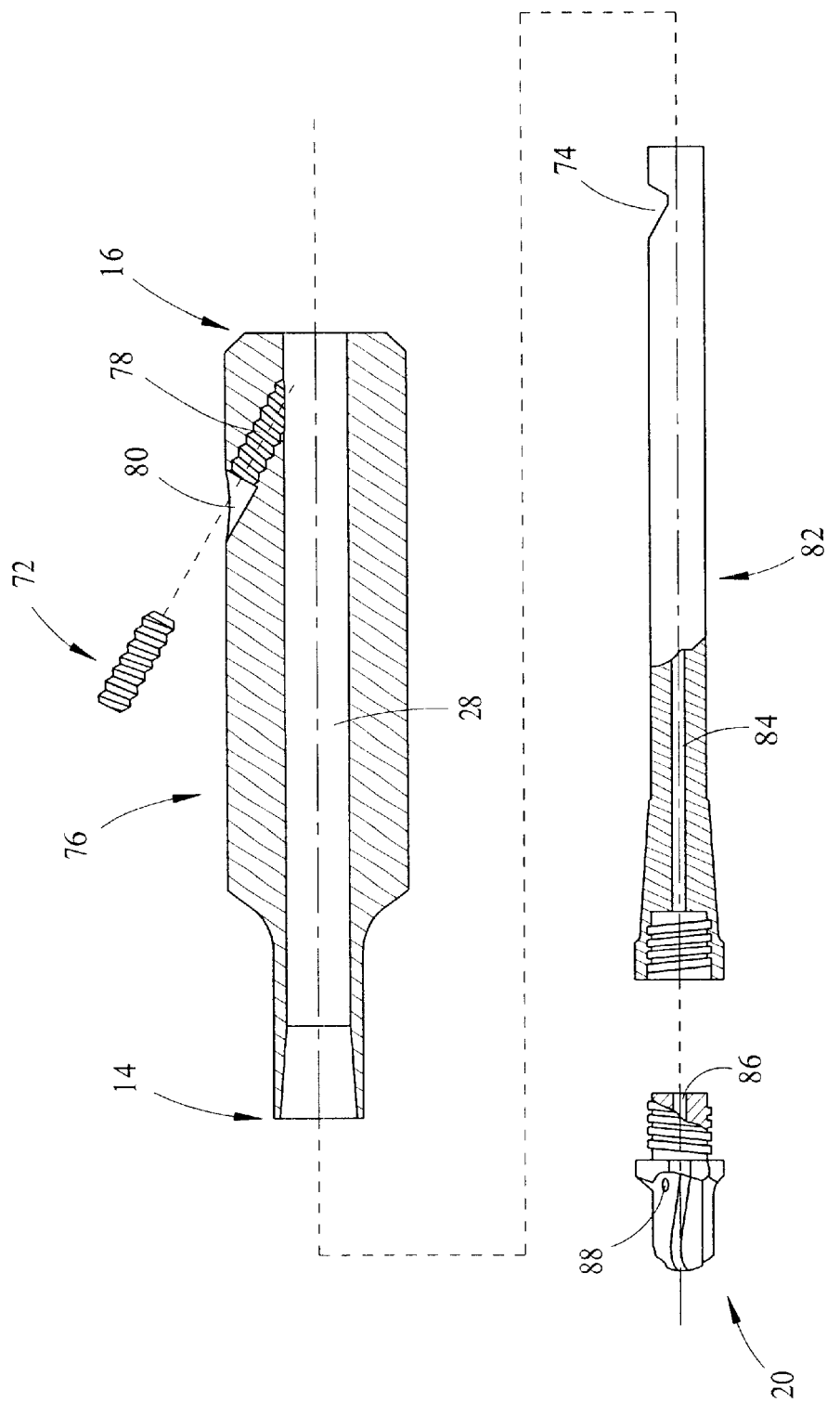

CUTTING TOOL ASSEMBLY

FIELD OF THE INVENTION

This invention relates generally to cutting tool assemblies for metal cutting machining having a replaceable cutting head, and more particularly to cutting tool assemblies having an elongated shank for rotary cutting operations.

BACKGROUND OF THE INVENTION

Such cutting tool assemblies have long been known. It has been proposed in EP 0 298 937 B1, to provide a cutting tool comprising a cutting body and a shaft that supports the cutting body. The cutting body is detachably connected to a locking screw via hook-shaped means. The hooked-shaped means transfers axial forces between the cutting body and the locking screw. Both the cutting body and the locking screw are provided with hook shaped means. Both of the hooked shaped means are provided with recesses and tongues. The recesses and tongues cooperate to permanently transfer rotational movement between the locking means and the cutting body. The locking screw is provided with an externally threaded portion that is connected to an internally threaded recess provided in the shaft. The threads are designed as right hand threads for right hand cutting tools and as left hand threads for left hand cutting tools. The locking screw is movable in the axial direction by relative rotation of the externally threaded portion with respect to the internally threaded recess. The shaft is provided with a conical seat and the cutting body is provided with a circumferential conical portion that is received in the conical seat of the shaft. The cutting body can be inserted in or removed from the conical seat by displacing the locking screw from its innermost position to an intermediate position.

The prior art cutting tool described above suffers from two basic disadvantages. First, to insert or remove the cutting body the locking screw has to be displaced from its innermost position to an intermediate position. Second, the cutting body cannot be used in conjunction with any other type of tool since it is formed with hook-shaped means and therefore it requires the presence of a locking screw having a compatible hook-shaped means.

It is an object of the present invention to provide a cutting tool assembly that substantially overcomes the above mentioned disadvantages.

SUMMARY OF THE INVENTION

In accordance with the present invention there is provided a cutting tool assembly comprising:
  a tool shank having a forward end and a rear end and a longitudinal axis passing through the forward and rear ends, an elongated hole extending axially from the forward end of the tool shank, the elongated hole adjacent the forward end of the tool shank having a conical portion, the tool shank having a first coupling member adjacent the rear end thereof;
  an elongated support bar having a forward end and a rear end with a threaded bore extending axially rearwardly from the forward end thereof, the elongated support bar having a conical portion rearward of the forward end thereof, the elongated support bar having a second coupling member adjacent the rear end thereof, the elongated support bar being removably retained in the elongated hole of the tool shank with the first coupling member coupled to the second coupling member and with at least a section of the conical portion of the elongated support bar being in abutment with the conical portion of the elongated hole; and
  a cutting head having a forward cutting portion and a rear threaded portion; the rear threaded portion of the cutting head being threadingly engaged with the threaded bore in the forward end of the elongated support bar.

In accordance with a first embodiment of the present invention, the elongated hole has a threaded portion adjacent the rear end thereof and wherein the elongated support bar has an externally threaded portion adjacent the rear end thereof and wherein the elongated support bar is removably retained in the elongated hole of the tool shank with the externally threaded portion of the elongated support bar threadingly engaged with the threaded portion of the elongated hole, the threaded portion of the elongated hole forming the first coupling member and the externally threaded portion of the elongated support bar forming the second coupling member.

In accordance with a second embodiment of the present invention, the cutting tool assembly further comprises a coupling bar generally cylindrically shaped having an internally threaded forward portion and an externally threaded rear portion and an axially extending through bore, wherein the elongated hole has a threaded portion adjacent the rear end thereof and wherein the elongated support bar has an externally threaded portion adjacent the rear end thereof and wherein the coupling bar is removably retained in the elongated hole of the tool shank adjacent the rear end thereof with the externally threaded rear portion of the coupling bar threadingly engaged with the threaded portion of the elongated hole and the elongated support bar is removably retained in the elongated hole with the externally threaded portion of the elongated support bar threadingly engaged with the internally threaded portion of the coupling bar, the internally threaded portion of the coupling bar forming the first coupling member and the externally threaded portion of the elongated support bar forming the second coupling member.

In accordance with a third embodiment of the present invention, the tool shank has a threaded through bore passing through a section of the tool shank, the threaded through bore extending from a side opening in the tool shank to the elongated hole, the elongated support bar being removably retained in the elongated hole of the tool shank by a securing screw threadingly engaged with the threaded through bore, the securing screw engaging a locking recess formed in the elongated support bar, the securing screw forming the first coupling member and the locking recess of the elongated support bar forming the second coupling member.

If desired, the elongated support bar is provided with a coolant channel for conducting a coolant fluid, the coolant channel extending axially from the rear end to the forward end of the elongated support bar.

Further if desired, the cutting head is provided with a coolant channel extending through the rear threaded portion thereof and exiting the cutting head at exit openings formed in the forward cutting portion thereof.

BRIEF DESCRIPTION OF THE DRAWINGS

For a better understanding the invention will now be described, by way of example only, with reference to the accompanying drawings in which:

FIG. 4 is a partially sectioned exploded side view of a third embodiment of the cutting tool assembly shown in FIG. 1.

DETAILED DESCRIPTION OF THE INVENTION

Figure 1:
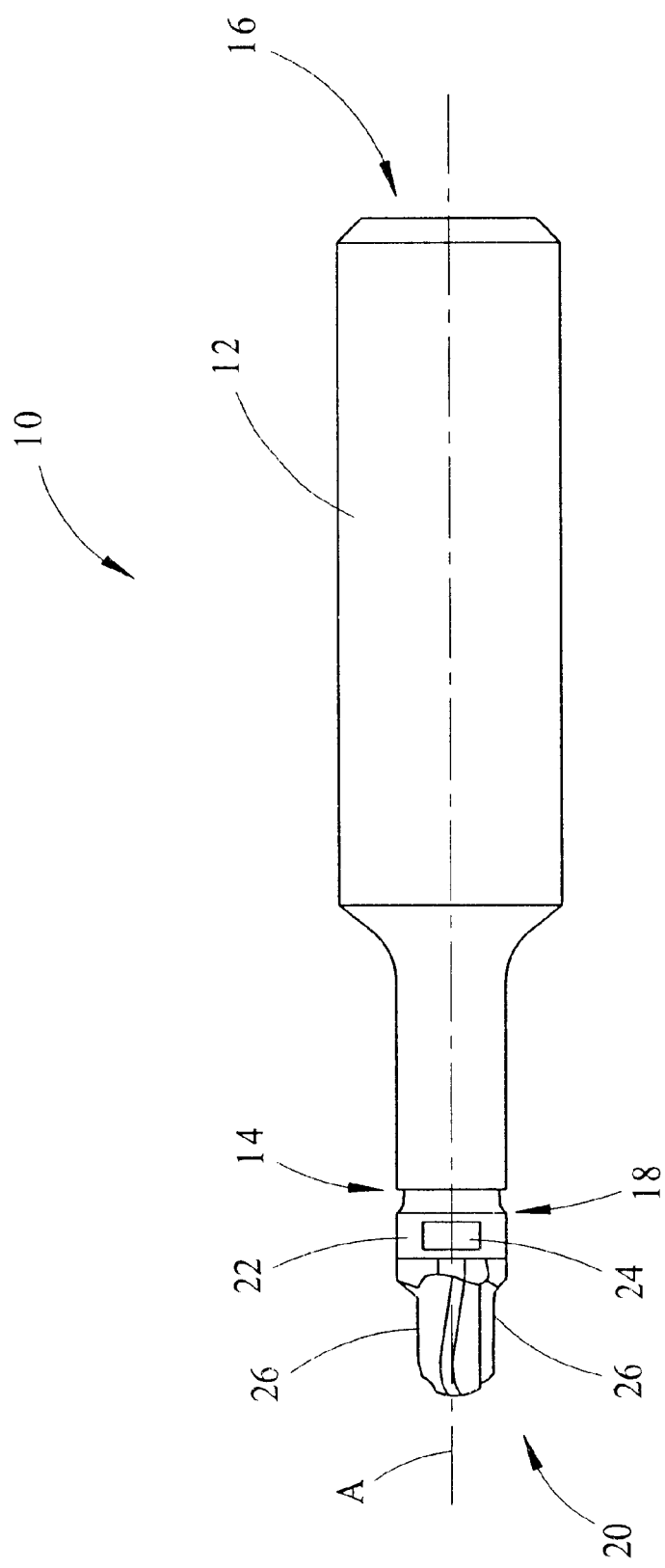
FIG. 1 is a side view of a cutting tool assembly in accordance with the present invention.

Attention is drawn to the drawings in general and to FIG. 1 in particular, showing a cutting tool assembly 10 in accordance with the present invention. The cutting tool assembly 10 comprises a tool shank 12 having a forward end 14 and a rear end 16 and a longitudinal axis A passing through the forward and rear ends. The tool shank 12 has rotational symmetry about the longitudinal axis A. Preferably, the tool shank 12 has a forward portion of smaller diameter than that of the rear portion. As will be described below in greater detail with respect to three specific embodiments of the invention, an elongated support bar 18 is removably retained in the tool shank 12 and a cutting head 20 is removably retained in the elongated support bar 18. The elongated support bar 18 preferably has a cylindrical end portion 22 adjacent the forward end 14 thereof. The cylindrical end portion 22 is preferably provided with diametrically opposite flat surfaces 24 for receiving the jaws of a spanner for tightening or loosening the elongated support bar. Similarly, the cutting head 20 is preferably provided with diametrically opposite flat surfaces 26 for receiving the jaws of a spanner for tightening or loosening the cutting head. Generally, the cutting head 20 is made of cemented carbide, whereas the tool shank 12 is preferably made of heavy metal such as Tungsten in order to reduce vibrations. The elongated support bar 18 is typically made of steel.

Figure 2:
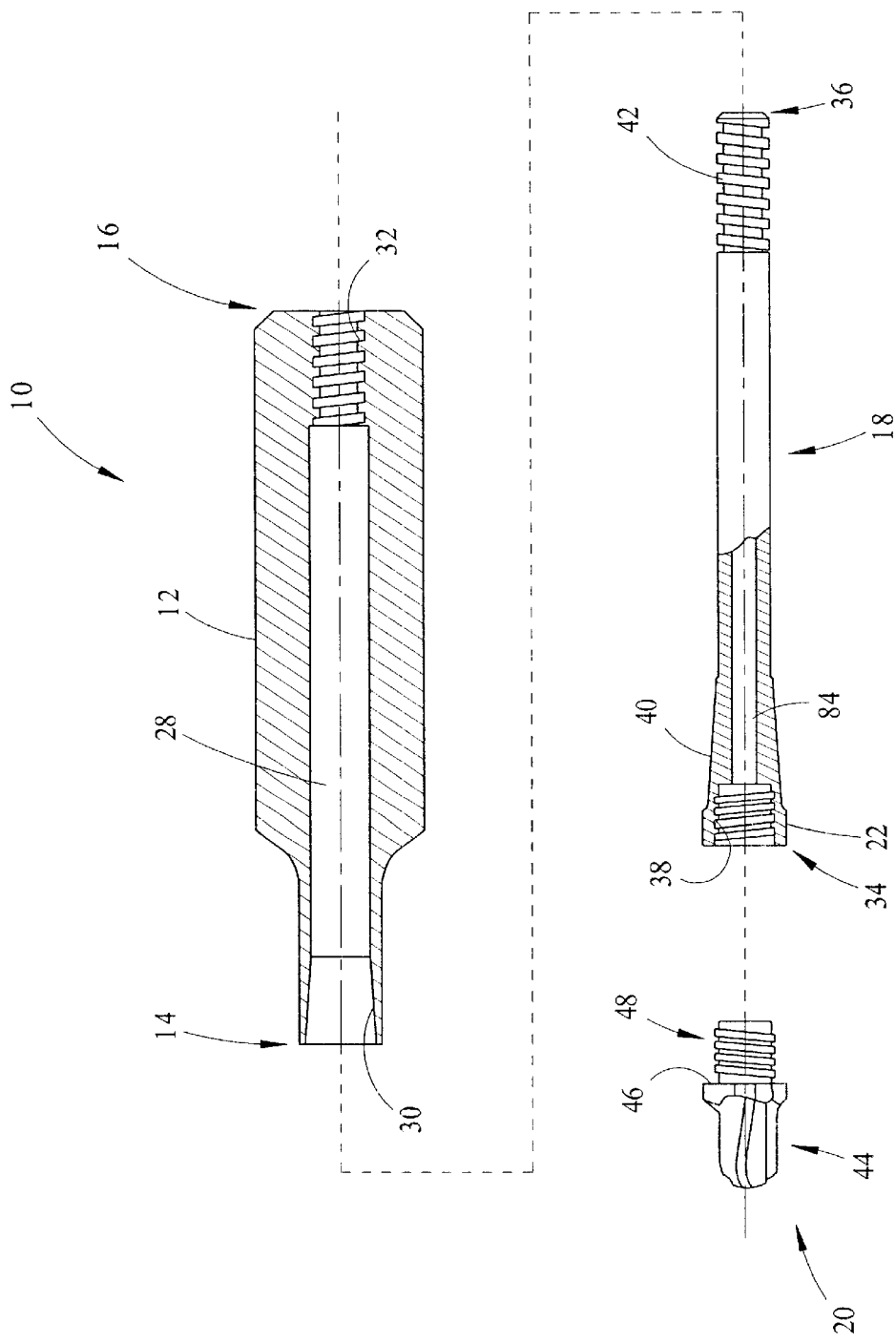
FIG. 2 is an exploded side view of a first embodiment of the cutting tool assembly shown in FIG. 1.

Attention is now drawn to FIG. 2 showing an exploded side view of a first embodiment of the cutting tool assembly 10 of the present invention. An elongated hole 28 extends axially from the forward end 14 to the rear end 16 of the tool shank 12. The elongated hole 28 has a conical portion 30 adjacent the forward end 14 of the tool shank and a threaded portion 32 adjacent the rear end 16 of the tool shank 12. The section of the elongated hole 28 rearward of the conical portion 30 is preferably cylindrical. The threaded portion 32 forms a first coupling member of the cutting tool assembly 10.

The elongated support bar 18 has a forward end 34 and a rear end 36. A threaded bore 38 extends rearwardly from the forward end 34 of the elongated support bar 18. The elongated support bar 18 has a conical portion 40 rearward of the forward end 34 thereof. The section of the elongated support bar 18 rearward of the conical portion 40 is preferably cylindrical. Also shown in FIG. 2 is the cylindrical end portion 22 between the forward end 34 and the conical portion 40. The elongated support bar 18 has an externally threaded portion 42 adjacent the rear end 36 thereof. The externally threaded portion 42 constitutes a second coupling member of the cutting tool assembly 10. The cutting head 20 has a forward cutting portion 44 with a rearwardly facing abutment surface 46 and a rear threaded portion 48.

In the assembled cutting tool assembly 10 in accordance with the first embodiment of the invention, the elongated support bar 18 is removably retained in the elongated hole 28 of the tool shank 12 with the externally threaded portion 42 in threaded engagement with the threaded portion 32 of the elongated hole 28 and at least a section of the conical portion 40 of the elongated support bar 18 in abutment with the conical portion 30 of the elongated hole 28. The cutting head 20 is removably retained in the elongated support bar 18 with the rear threaded portion 48 in threaded engagement with the threaded bore 38 in the forward end of the support bar 18. When the threaded engagement is complete, that is when the cutting head is fully tightened in position, the rearwardly facing abutment surface 46 abuts the forward end of the elongated support bar 18, as shown in FIG. 1.

Figure 3:
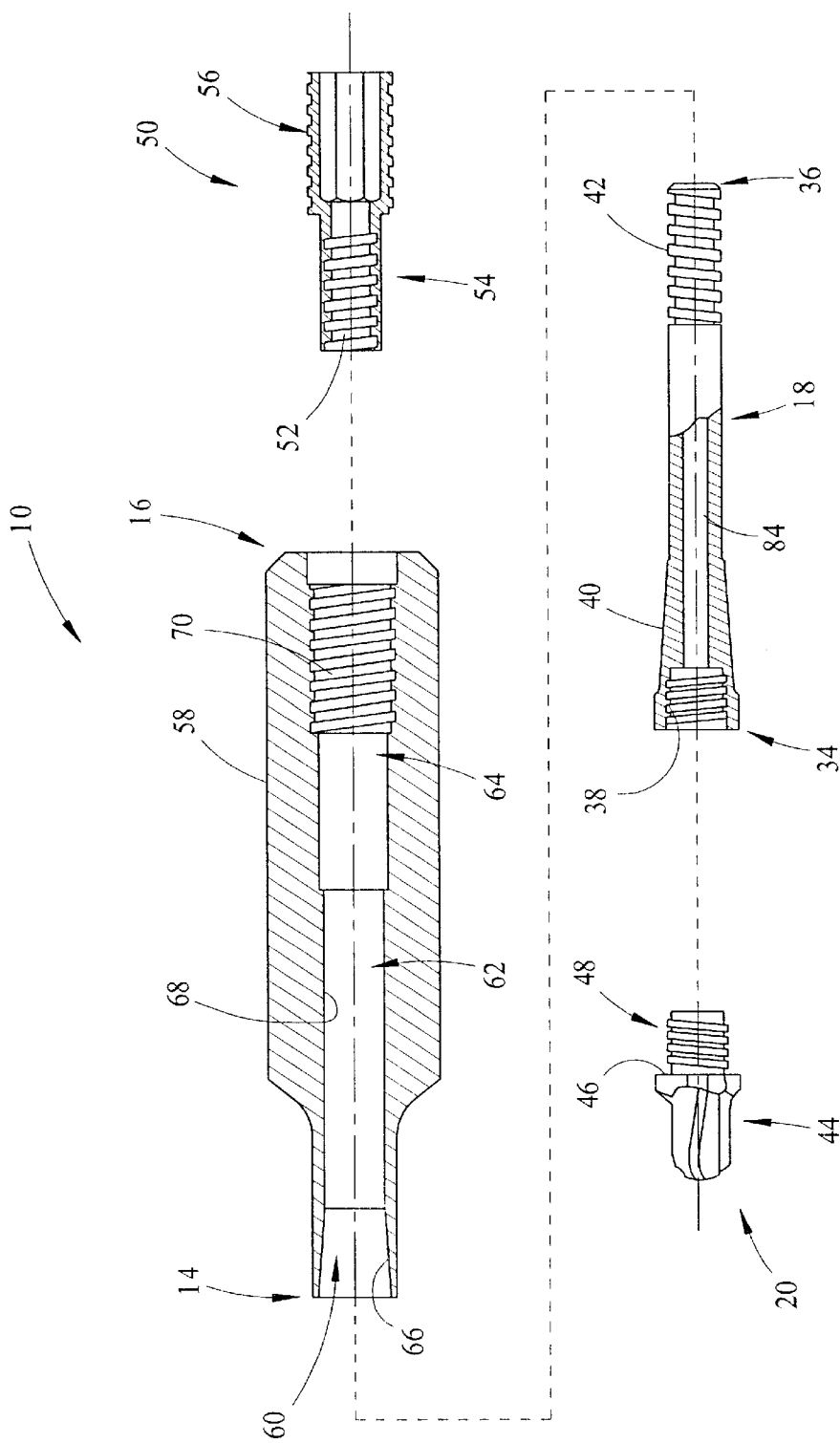
FIG. 3 is a partially sectioned exploded side view of a second embodiment of the cutting tool assembly shown in FIG. 1.

Attention is now drawn to FIG. 3 showing a partially sectioned exploded side view of a second embodiment of the cutting tool assembly 10 of the present invention. The cutting head 20 and the elongated support bar 18 are similar to those of the first embodiment. In accordance with the second embodiment, the cutting tool assembly further comprises a coupling bar 50 having a generally cylindrical shape and an axially extending through bore 52. The coupling bar 50 comprises two portions, an internally threaded forward portion 54 and an externally threaded rear portion 56. The diameter of the rear portion 56 is greater than the diameter of the forward portion 54. The internally threaded forward portion 54 has the same thread and internal diameter as the threaded portion 32 of the elongated hole 28 of the tool shank of the first embodiment. Therefore, the internally threaded forward portion 54 of the coupling bar 50 is capable of threadingly engaging the externally threaded portion 42 of the elongated support bar 18.

In accordance with the second embodiment, the cutting tool assembly has a tool shank 58 with an elongated hole 60 extending axially between the forward and rear ends thereof. The elongated hole 60 comprises two portions, a forward portion 62 and a rear portion 64. The forward portion 62 has a conical portion 66 adjacent the forward end of the tool shank 58 and a cylindrical portion 68 extending rearwardly from the conical portion 66. The rear portion 64 of the elongated hole 60 is cylindrical in shape and has a diameter that is larger than the diameter of the cylindrical portion 68 of the forward portion 62. The rear portion 64 of the elongated hole 60 has a threaded portion 70 adjacent the rear end of the tool shank 58. The threaded portion 70 is capable of threadingly engaging the externally threaded rear portion 56 of the coupling bar 50. The portion of the through bore 52 in the externally threaded rear portion 56 of the coupling bar 50 is coupling member 50 into the tool shank 58. In accordance with the second embodiment, the internally threaded portion 54 of the coupling bar 50 constitutes a first coupling member and the externally threaded portion 42 of the elongated support bar 18 constitutes a second coupling member of the cutting tool assembly 10.

In the assembled cutting tool assembly 10 in accordance with the second embodiment of the invention, the coupling bar 50 is removably retained in the rear portion 64 of the elongated hole 60 with the externally threaded rear portion 56 of the coupling bar 50 in threaded engagement with the threaded portion 70 of the rear portion 64 of the elongated hole 60. The elongated support bar 18 is removably retained in the elongated hole 60 of the tool shank 58 with the externally threaded portion 42 in threaded engagement with the internally threaded portion 54 of the coupling bar 50 and at least a section of the conical portion 40 of the elongated support bar 18 in abutment with the conical portion 66 of the elongated hole 60.

The cutting head 20 is removably retained in the elongated support bar 18 with the rear threaded portion 48 in threaded engagement with the threaded bore 38 in the forward end of the support bar 18. When the threaded engagement is complete, that is when the cutting head is fully tightened in position, the rearwardly facing abutment surface 46 abuts the forward end of the elongated support bar 18.

Attention is now drawn to FIG. 4 showing a partially sectioned exploded side view of a third embodiment of the cutting tool assembly 10 of the present invention. The cutting tool assembly in accordance with the third embodiment is similar to that of the first embodiment, where the first coupling member has been replaced by a securing screw 72 and the second coupling member has been replaced by a locking recess 74. The tool shank 76 has a threaded through bore 78 passing through a section of the tool shank, the threaded through bore 78 extends from a side opening 80 in the tool shank to the elongated hole 28. The side opening 80 can be located at any point rearward of the forward end 14 of the tool shank, but preferably adjacent the rear end of the tool shank 76. The elongated support bar 82 is removably retained in the elongated hole 28 of the tool shank 76 by the securing screw 72 which is threadingly engaged with the threaded through bore and which engages the locking recess 74 in the elongated support bar.

If desired, the elongated support bar 18, 82 is provided with a coolant channel 84 for conducting a coolant fluid, the coolant channel extending axially from the rear end to the forward end of the elongated support bar. The cutting head is provided with a coolant channel 86 extending through the rear threaded portion thereof and exiting the cutting head at exit openings 88 formed in the forward cutting portion thereof.

Although the present invention has been described to a certain degree of particularity, it should be understood that various alterations and modifications can be made without departing from the spirit or scope of the invention as hereinafter claimed.

What is claimed is:

1. A cutting tool assembly comprising:
   a tool shank having a forward end and a rear end and a longitudinal axis passing through the forward and rear ends, an elongated hole extending axially from the forward end of the tool shank, the elongated hole adjacent the forward end of the tool shank having a conical portion, the tool shank having a first coupling member adjacent the rear end thereof;
   an elongated support bar having a forward end and a rear end with a threaded bore extending axially rearwardly from the forward end thereof, the elongated support bar having a conical portion rearward of the forward end thereof, the elongated support bar having a second coupling member adjacent the rear end thereof, the elongated support bar being removably retained in the elongated hole of the tool shank with the first coupling member coupled to the second coupling member and with at least a section of the conical portion of the elongated support bar being in abutment with the conical portion of the elongated hole; and
   a cutting head having a forward cutting portion and a rear threaded portion; the rear threaded portion of the cutting head being threadingly engaged with the threaded bore in the forward end of the elongated support bar.

2. The cutting tool assembly according to claim 1, wherein the elongated hole has a threaded portion adjacent the rear end thereof and wherein the elongated support bar has an externally threaded portion adjacent the rear end thereof and wherein the elongated support bar is removably retained in the elongated hole of the tool shank with the externally threaded portion of the elongated support bar threadingly engaged with the threaded portion of the elongated hole, the threaded portion of the elongated hole forming the first coupling member and the externally threaded portion of the elongated support bar forming the second coupling member.

3. The cutting tool assembly according to claim 1, further comprising a coupling bar generally cylindrically shaped having an internally threaded forward portion and an externally threaded rear portion and an axially extending through bore, wherein the elongated hole has a threaded portion adjacent the rear end thereof and wherein the elongated support bar has an externally threaded portion adjacent the rear end thereof and wherein the coupling bar is removably retained in the elongated hole of the tool shank adjacent the rear end thereof with the externally threaded rear portion of the coupling bar threadingly engaged with the threaded portion of the elongated hole and the elongated support bar is removably retained in the elongated hole with the externally threaded portion of the elongated support bar threadingly engaged with the internally threaded portion of the coupling bar, the internally threaded portion of the coupling bar forming the first coupling ember and the externally threaded portion of the elongated support bar forming the second coupling member.

4. The cutting tool assembly according to claim 3, wherein the elongated support bar is provided with a coolant channel for conducting a coolant fluid, the coolant channel extending axially from the rear end to the forward end of the elongated support bar, and the cutting head is provided with a coolant channel extending through the rear threaded portion thereof and exiting the cutting head at exit openings formed in the forward cutting portion thereof.

5. The cutting tool assembly according to claim 1, wherein the tool shank has a threaded through bore passing through a section of the tool shank, the threaded through bore extending from a side opening in the tool shank to the elongated hole, the elongated support bar being removably retained in the elongated hole of the tool shank by a securing screw threadingly retained in the threaded through bore, the securing screw engaging a locking recess formed in the elongated support bar, the securing screw forming the first coupling member and the locking recess of the elongated support bar forming the second coupling member.

6. The cutting tool assembly according to claim 1, wherein the elongated support bar is provided with a coolant channel for conducting a coolant fluid, the coolant channel extending axially from the rear end to the forward end of the elongated support bar.

7. The cutting tool assembly according any one of the preceding claims, wherein the cutting is made of cemented carbide.

* * * * *